(12) United States Patent
Ide et al.

(10) Patent No.: US 8,178,459 B2
(45) Date of Patent: May 15, 2012

(54) CORROSION-RESISTANT MEMBER AND METHOD OF MANUFACTURING SAME

(75) Inventors: Takayuki Ide, Fukuoka-ken (JP); Masami Ando, Fukuoka-ken (JP); Hiromi Arimitsu, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 138 days.

(21) Appl. No.: 12/584,063

(22) Filed: Aug. 28, 2009

(65) Prior Publication Data

US 2010/0081557 A1   Apr. 1, 2010

Related U.S. Application Data

(60) Provisional application No. 61/097,867, filed on Sep. 18, 2008.

(30) Foreign Application Priority Data

Aug. 28, 2008  (JP) ................................ 2008-219314
Aug. 27, 2009  (JP) ................................ 2009-197028

(51) Int. Cl.
C04B 35/505 (2006.01)
(52) U.S. Cl. ........................................ 501/152; 279/128
(58) Field of Classification Search ................ 501/152; 252/521.1; 279/128
See application file for complete search history.

(56) References Cited

U.S. PATENT DOCUMENTS

| | | | |
|---|---|---|---|
| 6,919,287 B2 * | 7/2005 | Teratani et al. | 501/98.4 |
| 7,407,904 B2 * | 8/2008 | Ide et al. | 501/152 |
| 7,566,675 B2 | 7/2009 | Ide et al. | |
| 2007/0161499 A1 * | 7/2007 | Ide et al. | 501/152 |
| 2009/0226699 A1 * | 9/2009 | Murata et al. | 428/312.8 |
| 2010/0067165 A1 * | 3/2010 | Ando et al. | 361/234 |

FOREIGN PATENT DOCUMENTS

| | | | |
|---|---|---|---|
| JP | 10-189697 | | 7/1998 |
| JP | 2000191369 | * | 7/2000 |
| JP | 2001-089229 A | | 4/2001 |
| JP | 2001181042 | * | 7/2001 |
| JP | 2005-206402 A | | 8/2005 |
| JP | 2005239826 | * | 9/2005 |
| JP | 2005-335991 A | | 12/2005 |
| JP | 2006-069843 A | | 3/2006 |
| JP | 2007-045700 A | | 2/2007 |

* cited by examiner

*Primary Examiner* — Karl Group
(74) *Attorney, Agent, or Firm* — Carrier Blackman & Associates, P.C.; Joseph P. Carrier; William D. Blackman

(57) ABSTRACT

A corrosion-resistant member includes a ceramic member containing yttrium oxide as a main component, containing cerium element, and obtained by firing under a nonoxidizing atmosphere. The corrosion-resistant member that has high corrosion-resistant characteristics and includes a ceramic member having a low volume resistivity can be provided.

6 Claims, 2 Drawing Sheets a: PEAK ASSIGNED TO (222) FACE OF $Y_2O_3$
b: PEAK ASSIGNED TO (111) FACE OF $CeO_2$
c: MAXIMUM PEAK AFTER PRIMARY FIRING
d: MAXIMUM PEAK AFTER HIP PROCESSING

CORROSION-RESISTANT MEMBER AND METHOD OF MANUFACTURING SAME

CROSS-REFERENCE TO RELATED APPLICATIONS

This application is based upon and claims the benefit of priorities from the prior Japanese Patent Application No. 2008-219314, filed on Aug. 28, 2008, the prior Japanese Patent Application No. 2009-197028, filed on Aug. 27, 2009 and the prior U.S. Provisional Patent Application No. 61/097,867, filed on Sep. 18, 2008; the entire contents of which are incorporated herein by reference.

BACKGROUND OF THE INVENTION

1. Field of the Invention

An aspect of the invention relates to a corrosion-resistant member and a method for manufacturing the same.

2. Description of the Related Art

Ceramic members using yttrium oxide, which has high plasma-resistant characteristics, have conventionally been considered as a material that is used for members for semiconductor manufacturing apparatuses and the like and has both corrosion resistance and conductivity. Yttrium oxide is an insulating material. It is known that, when a substance having conductivity is added to this yttrium oxide, the volume resistivity thereof decreases.

Patent Document 1 describes that the volume resistivity becomes $1 \times 10^9$ Ωcm (Ω·cm) or less by adding SiC to yttrium oxide at a rate of 2 to 30 wt % and performing sintering by use of a hot press.

Patent Document 2 describes that the volume resistivity becomes $10^5$ to $10^{14}$ Ωcm by adding $TiO_{2-x}$ ($0<x<2$) to yttrium oxide at a rate of 1 to 15 wt %, performing oxidizing atmosphere firing, and then causing the workpiece to be in contact with a material containing carbon as a main component to perform firing under an inert gas or reducing atmosphere or HIP processing.

Patent Document 3 describes that the volume resistivity becomes $10^{-2}$ to $10^{10}$ Ωcm by adding any one of metal yttrium, carbon, yttrium nitride, and yttrium carbide to yttrium oxide at a rate of 0.5 to 10 wt % and performing firing under an inert pressured atmosphere.

Patent Document 4 describes a method for manufacturing a corrosion-resistant member made of yttrium oxide to which a lanthanoid oxide is added at a rate of 5 mass % or less.

On the other hand, the applicant discloses that a dense material can be obtained by adding a boron compound as a sintering-aid agent to yttrium oxide powder to perform firing at 1400 to 1500° C. (for example, refer to Patent Document 5).
Patent Document 1 JP-A 2006-069843(Kokai)
Patent Document 2 JP-A 2001-089229(Kokai)
Patent Document 3 JP-A 2005-206402(Kokai)
Patent Document 4 JP-A 2005-335991(Kokai)
Patent Document 5 JP-A 2007-45700(Kokai)

SUMMARY OF THE INVENTION

According to an aspect of the invention, there is provided a corrosion-resistant member including a ceramic member containing yttrium oxide as a main component, containing cerium element, and obtained by firing under a nonoxidizing atmosphere.

According to a favorable aspect of the invention, there is provided a corrosion-resistant member, wherein the cerium element contained in the yttrium oxide in the ceramic member is not less than 5 wt % and not more than 60 wt % on an oxide basis.

According to a favorable aspect of the invention, there is provided a corrosion-resistant member, wherein the volume resistivity of the ceramic member is not less than $1 \times 10^7$ Ωcm and less than $1 \times 10^{14}$ Ωcm at room temperature.

According to a favorable aspect of the invention, there is provided a corrosion-resistant member wherein a maximum peak position (2θ) obtained by X-ray diffraction at a surface of fired material of a ceramic member is shifted to a side of angles lower than a maximum peak position (2θ) obtained by powder X-ray diffraction of powder obtained as reference described below. (The reference is powder that is obtained by crushing a solid solution in which cubic cerium oxide is solid-dissolved in cubic yttrium oxide by oxidizing atmosphere firing.)

According to another aspect of the invention, there is provided a method for manufacturing a corrosion-resistant member including: adding cerium oxide to yttrium oxide at a rate of not less than 5 wt % and not more than 60 wt %; molding a mixture thereof; and performing firing under a nonoxidizing atmosphere at not lower than 1300° C. and not higher than 1800° C.

According to another aspect of the invention, there is provided a method for manufacturing a corrosion-resistant member including: adding a cerium compound to yttrium oxide at a rate of not less than 5 wt % and not more than 60 wt % on an oxide of cerium basis; molding a mixture thereof; performing firing under an oxidizing atmosphere at not lower than 1300° C. and not higher than 1800° C.; and performing a heat treatment under a nonoxidizing atmosphere at a temperature of not lower than 1300° C. and not higher than 1800° C.

According to another aspect of the invention, there is provided a method for manufacturing a corrosion-resistant member including: adding cerium oxide at a rate of not less than 5 wt % and not more than 60 wt % and a boron compound at a rate of not less than 0.02 wt % and not more than 10 wt % on a boron oxide basis to yttrium oxide; molding a mixture thereof; and performing firing under a nonoxidizing atmosphere at not lower than 1300° C. and not higher than 1600° C.

According to another aspect of the invention, there is provided a method for manufacturing a corrosion-resistant member including: adding a cerium compound at a rate of not less than 5 wt % and not more than 60 wt % on an oxide of cerium basis and a boron compound at a rate of not less than 0.02 wt % and not more than 10 wt % on a boron oxide basis to yttrium oxide, molding a mixture thereof; performing firing under an oxidizing atmosphere at not lower than 1300° C. and not higher than 1600° C.; and performing a heat treatment under a nonoxidizing atmosphere at a temperature of not lower than 1300° C. and not higher than 1600° C.

DETAILED DESCRIPTION OF THE INVENTION

Figure 1:
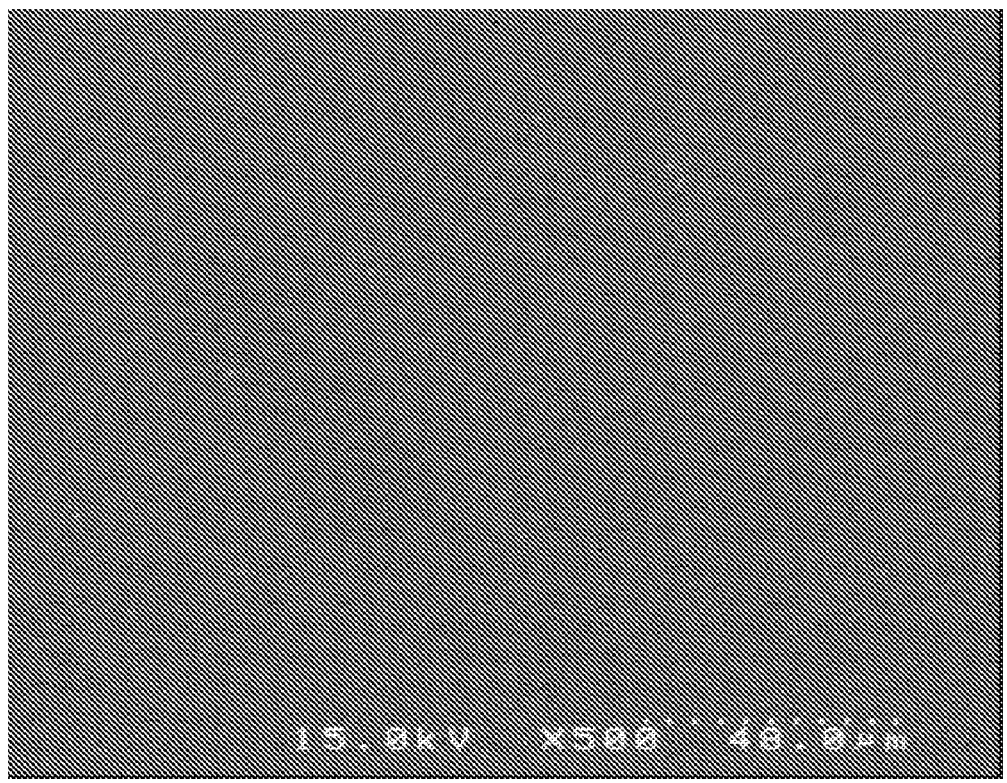
FIG. 1 shows an electron microscope photograph of a corrosion-resistant member according to an example of the invention.

Embodiments of the invention will now be described with reference to the drawings.

Terms used in this case will now be explained.

(Density)

The density in the invention is apparent density. Specifically, it is the mass of a sample divided by the exterior volume thereof from which open pores are excluded, and was measured by the Archimedes' method.

(Archimedes' Method)

The Archimedes' method in the invention is a density measuring method provided in JIS standards (JIS R1634). The measurement was performed by using the vacuum method for the water filling method and distilled water for the solvent liquid. The method for calculating pore rate was also carried out according to JIS R1634.

(Low Resistance)

The volume resistivity of yttrium oxide fired material is $1 \times 10^{14}$ Ωcm or more at room temperature (25° C.). The low resistance in the invention is defined as states of less than $1 \times 10^{14}$ Ωcm in which the volume resistivity of yttrium oxide, which is an insulating material, can be changed intentionally.

(Volume Resistivity)

The volume resistivity in the invention is the electrical resistance of the test materials provided in JIS standards (JIS C2141) converted to a per-unit-volume basis. Volume resistivities at room temperature (25° C.) were measured by the three-terminal method.

(Oxidizing Atmosphere)

The oxidizing atmosphere in the invention is an atmosphere containing oxygen, in which air atmosphere and/or oxygen concentration are controlled.

(Nonoxidizing Atmosphere)

The nonoxidizing atmosphere in the invention is a reducing atmosphere and an inert atmosphere. Specifically, the reducing atmosphere is an atmosphere containing reducing gas such as CO and $H_2$, and the inert atmosphere is an atmosphere in the case where inert gas such as $N_2$ and Ar is introduced and heated, (X-Ray Diffraction Profile)

The X-ray diffraction profile in the invention is a chart with the angle (2θ) at which a diffracted X-ray is detected on the horizontal axis and the diffraction intensity on the vertical axis, when a sample is irradiated with an X-ray of CuKα line by using a Cu tube. In the invention, an angle (2θ) at which a diffracted X-ray is detected is designated as a peak position, and a peak of which the detected intensity of the diffracted X-ray is highest is designated as a maximum peak.

(Shift of an X-Ray Diffraction Peak Position to the Low-Angle Side)

The shift of an X-ray diffraction peak position to the low-angle side in the invention is that the 2θ of the X-ray diffraction at the surface of a ceramic member that contains yttrium oxide as a main component and is obtained by firing is shifted to the side of angles lower than the 2θ of the powder X-ray diffraction of the following reference. (The reference is powder obtained by crushing a solid solution in which cubic cerium oxide: JCPDF card 01-071-4807 is solid-dissolved in cubic yttrium oxide: JCPDF card 00-041-1105 by oxidizing atmosphere firing.)

Next, one embodiment of the invention will now be described.

(Mixing and Raw Material Powder)

In the case where an oxide is used for a raw material, raw materials are mixed by using a mixing method such as a ball mill used in steps for manufacturing ceramics. Although there is no limit on the particle size of yttrium oxide raw material powder, it is preferably not more than 10 μm and more preferably not more than 2 μm on average. Although there is no limit on the lowest limit, it is preferably not less than 0.1 μm in view of avoiding reduced moldability. Although there is also no limit on the particle size of cerium oxide raw material powder, it is preferably not more than 10 μm and more preferably not more than 2 μm on average. Although there is no limit on the lowest limit, it is preferably not less than 0.1 μm in view of avoiding reduced moldability. Mixing methods such as a ball mill accompanied by a crushing step have effects of not only lowering particle sizes but also crushing coarse particles, and are preferably used in order to obtain a ceramic member made of homogeneous fine particles.

In the case where a water-soluble compound such as cerium nitrate is used as raw material powder that forms an oxide of cerium under an oxidizing atmosphere, then an yttrium oxide raw material is introduced into an aqueous solution of the cerium compound, a wet-mixed slurry is fired under an oxidizing atmosphere, and a loosening step is performed as required. Thereby, (yttrium oxide)-(cerium oxide) raw material powder in which cerium oxide is homogeneously dispersed is obtained, and this can be used as a raw material powder.

(Molding)

The molding method in the embodiment of the invention can provide a compact by using a dry molding method such as press-molding and CIP on granulated powder. The molding is not limited to dry molding. Molding methods such as extrusion molding, injection molding, sheet molding, casting, and gel-casting may be used to obtain a compact. In the case of dry molding, a binder may be added and a spray dryer etc. may be used to make granules for use.

(Firing)

In one embodiment of the invention, firing under an oxidizing atmosphere at not lower than 1300° C. and not higher than 1800° C. is possible, and firing in an electrical furnace including an SIC heating element and/or a Kanthal heating element is possible. After the oxidizing atmosphere firing, a heat treatment under a nonoxidizing atmosphere may be performed at temperatures of not lower than 1300° C. and not higher than 1800° C. Thereby, a ceramic member is obtained. The resulting ceramic member may undergo HIP processing as required. Thereby, the open pore rate becomes 0% or more and less than 0.1%, more preferably less than 0.05%, and a dense ceramic member can be obtained.

In one embodiment of the invention, the firing process under the nonoxidizing atmosphere after the firing under the oxidizing atmosphere mentioned above may be replaced with HIP processing, and thereby a ceramic member of the invention can be obtained. Even in the case where the nonoxidizing atmosphere firing is omitted and the HIP processing is performed, a ceramic member equivalent to the fired material mentioned above is obtained. The ceramic member after the HIP processing has an open pore rate of 0% or more and less than 0.1%, more preferably less than 0.05%, and a dense ceramic member can be obtained.

In one embodiment of the invention, firing under a nonoxidizing atmosphere at not lower than 1300° C. and not higher than 1800° C. is possible. A ceramic member of one embodiment of the invention is obtained by the firing under a nonoxidizing atmosphere. The resulting ceramic member may undergo HIP processing as required. Thereby, the open pore rate becomes 0% or more and less than 0.1%, more preferably less than 0.05%, and a dense ceramic member can be obtained.

The following may be used as the cerium compound added to yttrium oxide: a cerium compound that becomes an oxide in the course of firing under an oxidizing atmosphere such as dicerium trioxide ($Ce_2O_3$), cerium oxide ($CeO_2$), cerium chloride, ammonium salt of cerium nitrate, hydrate of cerium trinitrate, cerium hydroxide, cerium carbonate, cerium boride, cerium oxalate, and cerium acetate. Cerium oxide may be preferably used.

In the case where a boron compound is added in raw material ceramic in order to improve sinterability, since the boron compound easily evaporates during firing, it is preferable that firing is performed while using a muffle and the like. The boron compound forms $Y_3BO_6$ in the course of firing and forms a liquid phase at temperatures of 1100 to 1600° C. to promote sintering.

In the case where a boron compound is added, since a liquid phase is formed at temperatures in the range of 1100 to 1600° C., firing is performed preferably at temperatures in the range of not lower than 1300° C. and not higher than 1600° C., and more preferably not lower than 1400° C. and not higher than 1550° C. The firing time may be selected from the range of 0.5 to 8 hours.

Even in the case where a boron compound is added, a desired ceramic member can be obtained by obtaining a fired material by molding, degreasing, and then performing oxidizing atmosphere firing, after which a heat treatment under a nonoxidizing atmosphere of $N_2$, Ar, CO, $H_2$ and the like is performed. Further, a desired ceramic member can be obtained by molding and then performing firing under an atmosphere of nitrogen, argon, hydrogen, and the like or firing in a vacuum.

The resulting ceramic sintered material may undergo HIP processing. Thereby, the open pore rate becomes 0% or more and less than 0.1%, more preferably less than 0.05%, and a dense ceramic member can be obtained.

A boron compound that forms the $Y_3BO_6$ crystal mentioned above is not limited to boron oxide, but may be boric acid, boron nitride, boron carbide, $YBO_3$, $Y_3BO_6$ and the like. Among these, boron oxide, boric acid, and $YBO_3$ may be preferably used.

The specific properties of the fired material obtained by such manufacturing methods will now be described.

In the case where yttrium oxide and cerium oxide are mixed and undergo air firing, it has been confirmed that yttrium oxide and cerium oxide form one crystal phase. This crystal phase has a high volume resistivity of $1 \times 10^{15}$ Ωcm or more at room temperature. However, in the case of the fired material obtained by the nonoxidizing atmosphere firing or the sintered material obtained by the air firing and treated with a nonoxidizing atmosphere, it has been confirmed that the peak position of the crystal phase obtained by the air firing shifts to the low-angle side. It has been found out that the peak-shifted fired material develops a low resistance.

When the lattice constant of the crystal phase obtained by the air firing was calculated from the peak position thereof, it has been confirmed that it is a lattice constant corresponding to the rate of the lattice constants of yttrium oxide and cerium oxide.

On the other hand, the lattice constant of the sample that was fired under the nonoxidizing atmosphere was calculated to be a value larger than the lattice constant obtained by the air firing. It is conceivable that this change of lattice has brought about the peak shift and thus has been confirmed. Since the peak shift is developed by the change of lattice, the phenomenon of peak shift of the proposal is not limited to that of the maximum peak.

The corrosion-resistant member obtained by the invention can be used for members of apparatuses for manufacturing a semiconductor or a liquid crystal that are exposed to a plasma atmosphere, such as a chamber, bell jar, susceptor, clamp ring, focus ring, capture ring, shadow ring, insulating ring, liner, dummy wafer, tube for generating high-frequency plasma, dome for generating high-frequency plasma, lift pin for supporting a semiconductor wafer, shower plate, baffle plate, bellows cover, upper electrode, lower electrode, screw for fixing members of the chamber interior, screw cap, and robot arm. For example, in the case of a chamber and a bell jar, the corrosion-resistant member is used for the inner wall faces that are irradiated with plasma, and in the case of a focus ring and a capture ring, it can be used for faces that come in contact with a plasma atmosphere. Further, in the case of other members, the corrosion-resistant member can be used for faces that are exposed to a plasma atmosphere.

Furthermore, since the corrosion-resistant member of the invention has a volume resistivity of not less than $1 \times 10^7$ Ωcm and less than $1 \times 10^{14}$ Ωcm, it can be used for Johnsen-Rahbeck-type electrostatic chucks of etching apparatuses that perform microfabrication on a semiconductor wafer or a quartz wafer, and the like.

Moreover, the corrosion-resistant member of the invention can be used for: corrosion prevention members of a carrier pipe etc. for carrying corrosive solution, corrosive gas, etc. such as hydrogen fluoride; crucibles used during chemical processing etc. using corrosive solution; and the like.

The corrosion-resistant member according to one embodiment of the invention is a ceramic member made of yttrium oxide and cerium element. Since the added cerium element does not exist separately at the grain boundaries or the triple junctions of yttrium oxide, a ceramic member having a high plasma resistance is obtained without impairing the corrosion-resistant characteristics of yttrium oxide.

EXAMPLE 1

Yttrium oxide powder ($Y_2O_3$, average particle size: 1 μm, specific surface area: 11 to 15 m²/g) and cerium oxide powder ($CeO_2$, average particle size: 0.6 μm, specific surface area: approximately 20 m²/g) were prepared as raw materials.

Yttrium oxide powder, cerium oxide powder and boron oxide powder (as a reagent) were mixed so that the additive amount of cerium oxide was 5 wt %, boron oxide was 1 wt % (viz. yttrium oxide: 94 wt %). Furthermore, a dispersing agent, a binder, and a mold releasing agent were added into the mixture (yttrium oxide, cerium oxide and boron oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1480° C. The resulting fired material underwent HIP processing under an argon atmosphere of 100 MPa at 1500° C. for two hours.

EXAMPLE 2

Yttrium oxide powder ($Y_2O_3$, average particle size: 1 μm, specific surface area: 11 to 15 m²/g) and cerium oxide powder ($CeO_2$, average particle size: 0.6 μm, specific surface area: approximately 20 m²/g) were prepared as raw materials.

Yttrium oxide powder, cerium oxide powder and boron oxide powder (reagent) were mixed so that the additive amount of cerium oxide was 10 wt %, boron oxide was 1 wt % (viz. yttrium oxide: 89 wt %). Furthermore, a dispersing agent, a binder, and a mold releasing agent were added into the mixture (yttrium oxide, cerium oxide and boron oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1480° C. The resulting fired material underwent HIP processing under an argon atmosphere of 100 MPa at 1500° C. for two hours.

EXAMPLE 3

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 20 wt % (viz, yttrium oxide: 80 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C. The resulting fired material underwent HIP processing under an argon atmosphere of 100 MPa at 1500° C. for two hours.

EXAMPLE 4

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 40 wt % (viz. yttrium oxide: 60 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C. The resulting fired material underwent HIP processing under an argon atmosphere of 100 MPa at 1500° C. for two hours.

EXAMPLE 5

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 60 wt % (viz. yttrium oxide: 40 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C. The resulting fired material underwent HIP processing under an argon atmosphere of 100 MPa at 1500° C. for two hours.

EXAMPLE 6

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 5 wt % (viz. yttrium oxide: 95 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C. The resulting fired material underwent HIP processing under an argon atmosphere of 100 MPa at 1500° C. for two hours.

EXAMPLE 7

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 15 wt % (viz. yttrium oxide: 85 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C. The resulting fired material underwent HIP processing under an argon atmosphere of 100 MPa at 1500° C. for two hours.

EXAMPLE 8

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder, cerium oxide powder and boron oxide powder (reagent) were mixed so that the additive amount of cerium oxide was 20 wt %, boron oxide was 1 wt % (viz. yttrium oxide: 79 wt %). Furthermore, a dispersing agent, a binder, and a mold releasing agent were added into the mixture (yttrium oxide, cerium oxide and boron oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1480° C. The resulting fired material underwent HIP processing under an argon atmosphere of 100 MPa at 1500° C. for two hours.

COMPARATIVE EXAMPLE 1

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 80 wt % (viz, yttrium oxide: 20 wt %). Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. The resulting compact was degreased, and then was fired under an oxidizing atmosphere at 1650° C. The sample to which cerium oxide was added at a rate of 80 wt % had a cracking due to the heat treatment for degreasing, and was difficult to calcine. Thus, the volume resistivity of the resulting fired material was not measured.

COMPARATIVE EXAMPLE 2

Comparative Example 2 is a high-purity yttrium oxide fired material.

COMPARATIVE EXAMPLE 3

Comparative Example 3 is a high-purity aluminum oxide fired material with a purity of 99.7%.

COMPARATIVE EXAMPLE 4

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 20 wt %. Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C.

COMPARATIVE EXAMPLE 5

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 40 wt %. Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C.

COMPARATIVE EXAMPLE 6

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 60 wt %. Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C.

COMPARATIVE EXAMPLE 7

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 5 wt %. Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C.

COMPARATIVE EXAMPLE 8

Yttrium oxide powder ($Y_2O_3$, average particle size: 1 μm, specific surface area: 11 to 15 $m^2/g$) and cerium oxide powder ($CeO_2$, average particle size: 0.6 μm, specific surface area: approximately 20 $m^2/g$) were prepared as raw materials.

Yttrium oxide powder and cerium oxide powder were mixed so that the additive amount of cerium oxide was 15 wt %. Furthermore, a dispersing agent, a binder, and a mold releasing agent were added into the mixture (yttrium oxide and cerium oxide) to perform crushing stirring mixing by use of a ball mill.

After mixing, granulation with a spray dryer was performed. The resulting granulated powder underwent press molding and then CIP molding. A fired material is obtained stably by performing the granulation with the spray dryer and the CIP processing to increase the compact density. The resulting compact was degreased, and then was fired under an oxidizing atmosphere at 1650° C.

The densities and the volume resistivities of the ceramic members obtained by Examples 1 to 8 and Comparative Example 1 are shown in Table 1. The volume resistivities of the ceramic members of Examples 1 to 8 were not less than $1 \times 10^7$ Ωcm and less than $1 \times 10^{14}$ Ωcm.

Further, the ceramic members of Examples 1 to 8 were dense. The electron microscope photograph of the cross-section of the ceramic member of Example 4 is shown in FIG. 1 as a representative example. This ceramic member is composed of homogeneous structures, which are dense structures that do not include pores.

From the above results, ceramic members that have a volume resistivity of not less than $1 \times 10^7$ Ωcm and less than $1 \times 10^{14}$ Ωcm at room temperature were obtained, by adding the cerium element into the yttrium oxide at a rate of not less than 5 wt % and not more than 60 wt % on an oxide basis.

TABLE 1

| | Composition (wt %) | | | Fired material density (g/cm³) | Volume resistivity (Ω cm) |
|---|---|---|---|---|---|
| | $Y_2O_3$ | $CeO_2$ | $B_2O_3$ | | |
| Example 1 | 94 | 5 | 1 | 5.06 | $3.1 \times 10^{13}$ |
| Example 2 | 89 | 10 | 1 | 5.11 | $3.0 \times 10^{11}$ |
| Example 3 | 80 | 20 | 0 | 5.25 | $5.1 \times 10^9$ |
| Example 4 | 60 | 40 | 0 | 5.46 | $1.6 \times 10^7$ |
| Example 5 | 40 | 60 | 0 | 5.77 | $1.5 \times 10^7$ |
| Example 6 | 95 | 5 | 0 | 5.08 | $9.4 \times 10^{11}$ |
| Example 7 | 85 | 15 | 0 | 5.19 | $7.5 \times 10^{10}$ |
| Example 8 | 79 | 20 | 1 | 5.21 | $7.7 \times 10^9$ |
| Comparative Example 1 | 20 | 80 | 0 | Firing impossible | |

In order to evaluate the plasma resistance of the corrosion-resistant members of the one embodiment of the invention, a plasma irradiation treatment of 1000 W for thirty hours was performed on Examples 1 to 8 and Comparative Examples 2 and 3, by using a reactive ion etching apparatus (ANELVA Corporation, DEA-506) and etching gases of $CF_4$ (40 sccm) and $O_2$ (10 sccm). The results are shown in Table 2.

TABLE 2

| | Composition (wt %) | | | Etching rate (nm/h) |
|---|---|---|---|---|
| | $Y_2O_3$ | $CeO_2$ | $B_2O_3$ | |
| Example 1 | 94 | 5 | 1 | 78 to 80 |
| Example 2 | 89 | 10 | 1 | 54 to 62 |
| Example 3 | 80 | 20 | 0 | 40 to 55 |
| Example 4 | 60 | 40 | 0 | 57 to 76 |
| Example 5 | 40 | 60 | 0 | 65 to 78 |
| Example 6 | 95 | 5 | 0 | 44 to 52 |
| Example 7 | 85 | 15 | 0 | 51 to 58 |
| Example 8 | 79 | 20 | 1 | 43 to 60 |
| Comparative Example 2 | 100 | 0 | 0 | 40 to 80 |
| Comparative Example 3 | $Al_2O_3$ | | | 220 to 300 |

It becomes clear that Examples 1 to 8 have a plasma resistance equal to or more than that of the high-purity yttrium oxide of Comparative Example 2 and have a quite excellent plasma resistance compared to the high-purity alumina of Comparative Example 3.

The relationships between the amount of added cerium oxide, the firing atmosphere, and the maximum peak position (2θ/CuKα) of Examples 3 to 7 and Comparative Examples 4 to 8 are shown in Table 3.

The peak shift after the nonoxidizing atmosphere firing varies with the amount of added cerium oxide, and the shift amount tends to increase as the amount of added cerium oxide increases. Further, it has been confirmed that the resistance value tends to decrease as the shift amount increases.

TABLE 3

| | | | 2θ/degree (CuKα) | Volume resistivity (Ω cm) |
|---|---|---|---|---|
| Example 3 | $CeO_2$ 20 wt % | Reducing atmosphere firing | 28.91 | $5.1 \times 10^9$ |
| Example 4 | $CeO_2$ 40 wt % | Reducing atmosphere firing | 28.70 | $1.6 \times 10^7$ |
| Example 5 | $CeO_2$ 60 wt % | Reducing atmosphere firing | 28.43 | $1.5 \times 10^7$ |
| Example 6 | $CeO_2$ 5 wt % | Reducing atmosphere firing | 29.07 | $9.4 \times 10^{11}$ |
| Example 7 | $CeO_2$ 15 wt % | Reducing atmosphere firing | 28.93 | $7.5 \times 10^{10}$ |
| Comparative Example 4 | $CeO_2$ 20 wt % | Oxidizing atmosphere firing | 29.02 | $1 \times 10^{15}$ or more |
| Comparative Example 5 | $CeO_2$ 40 wt % | Oxidizing atmosphere firing | 28.98 | $1 \times 10^{15}$ or more |
| Comparative Example 6 | $CeO_2$ 60 wt % | Oxidizing atmosphere firing | 28.94 | $1 \times 10^{15}$ or more |
| Comparative Example 7 | $CeO_2$ 5 wt % | Oxidizing atmosphere firing | 29.08 | $1 \times 10^{15}$ or more |
| Comparative Example 8 | $CeO_2$ 15 wt % | Oxidizing atmosphere firing | 29.98 | $1 \times 10^{15}$ or more |

Figure 2:
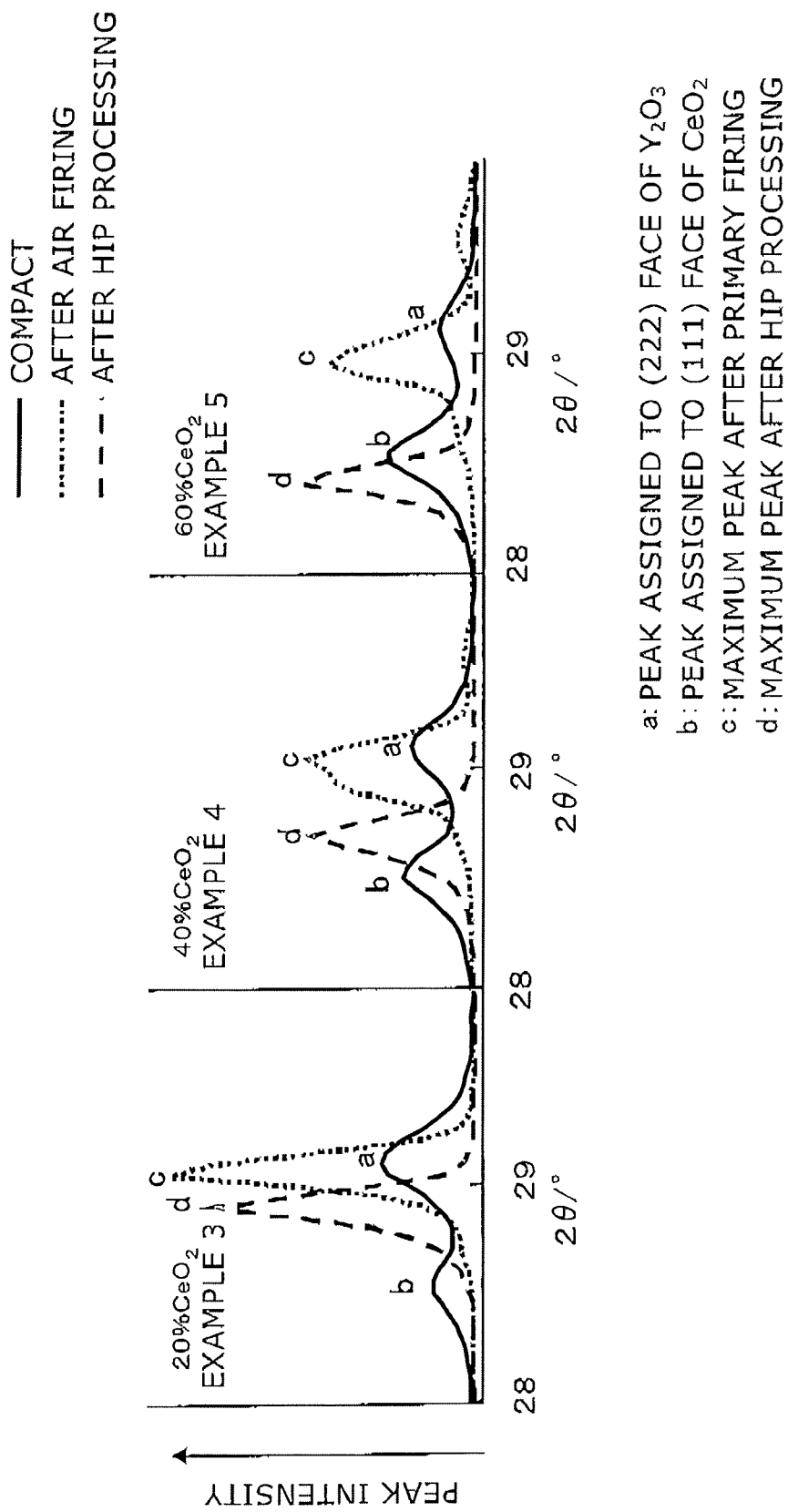
FIG. 2 shows X-ray diffraction profiles at the detection angle (2θ=28 to 30 degree) of a corrosion-resistant member according to an example of the invention.

With respect to the samples of Examples 3 to 5, the changes in the maximum peak position in the X-ray diffraction profiles of the compact, the air-fired material, and the HIP-processed material are shown in FIG. 2.

With regard to the compacts, the peak ("a" in the figure) assigned to (222) of yttrium oxide and the peak ("b" in the figure) assigned to (111) of cerium oxide are separated. The two peaks become one ("c" in the figure) by the air firing, and the peak position is located between the two peaks. After the HIP, a shift from the position of "c" to the low-angle side was observed ("d" in the figure). This phenomenon, that is, the behavior of the shift to the low-angle side by the HIP processing, was observed regardless of the amount of added cerium.

The invention claimed is:

1. A corrosion-resistant member comprising a ceramic member consisting of yttrium oxide, and not less than 5 wt % and not more than 60 wt % cerium element on an oxide basis, wherein
   the ceramic member is obtained by firing under a nonoxidizing atmosphere, and
   volume resistivity of the ceramic member is not less than $1 \times 10^7$ Ωcm and less than $1 \times 10^{14}$ Ωcm at room temperature.

2. The corrosion-resistant member according to claim 1, wherein a maximum peak position (20) obtained by X-ray diffraction at a surface of fired material of the ceramic member is shifted to a side of angles lower than a maximum peak position (20) obtained by powder X-ray diffraction of powder obtained as reference by crushing a solid solution in which cubic cerium oxide is solid-dissolved in cubic yttrium oxide by oxidizing atmosphere firing.

3. The corrosion-resistant member according to claim 1, wherein the corrosion-resistant member is an electrostatic chuck.

4. The corrosion-resistant member according to claim 1, wherein the member is fired under a nonoxidizing atmosphere at not lower than 1300° C. and not higher than 1800° C.

5. The corrosion-resistant member according to claim 1, wherein the member is fired under an oxidizing atmosphere at not lower than 1300° C. and not higher than 1800° C., and is subsequently heat treated under a nonoxidizing atmosphere at a temperature of not lower than 1300° C. and not higher than 1800° C.

6. A corrosion-resistant member comprising a ceramic member consisting of yttrium oxide, not less than 5 wt % and not more than 60 wt % cerium element on an oxide basis, and not less than 0.02 wt % and not more than 10 wt % boron compound on a boron oxide basis, wherein the ceramic member is obtained by firing under a nonoxidizing atmosphere, the specified content of the boron compound contained in the ceramic member is prior to firing under the nonoxidizing atmosphere, and volume resistivity of the ceramic member is not less than $1 \times 10^7$ Ωcm and less than $1 \times 10^{14}$ Ωcm at room temperature.

* * * * *